United States Patent [19]

Yoshida et al.

[11] Patent Number: 4,533,968
[45] Date of Patent: Aug. 6, 1985

[54] CERAMIC GUIDES FOR TAPE-LIKE MATERIALS AND PROCESS FOR THE PRODUCTION THEREOF

[75] Inventors: Tuneo Yoshida; Kengo Oishi; Motohiko Yagi, all of Kanagawa, Japan

[73] Assignee: Fuji Photo Film Co., Ltd., Japan

[21] Appl. No.: 428,510

[22] Filed: Sep. 29, 1982

[30] Foreign Application Priority Data

Sep. 29, 1981 [JP] Japan ................... 56-152939

[51] Int. Cl.$^3$ ............................... G11B 15/60
[52] U.S. Cl. ................... 360/130.21; 242/76; 242/157 R; 226/196
[58] Field of Search .............. 360/130.2, 130.21; 242/76, 157 R, 157 C; 226/190, 193, 196

[56] References Cited

U.S. PATENT DOCUMENTS

| | | | |
|---|---|---|---|
| 3,787,229 | 1/1974 | Rudness | 242/157 C X |
| 4,062,484 | 12/1977 | Rausch et al. | 242/76 X |
| 4,378,899 | 4/1983 | Sanford | 226/190 X |

FOREIGN PATENT DOCUMENTS 513386  12/1976  U.S.S.R. ................... 360/130.21

*Primary Examiner*—John H. Wolff
*Attorney, Agent, or Firm*—Sughrue, Mion, Zinn, Macpeak and Seas

[57] ABSTRACT

A ceramic guide for tape-like materials such as magnetic recording tapes, movie films, and microfilms, and a process for producing such ceramic guides are described. The ceramic guide is a sintered product of (A) 98 to 93 parts by weight of barium titanate, (B) 2 to 7 parts by weight of a silicate inorganic binder, and (C) 0.2 to 2 parts by weight, per 100 parts by weight of (A) and (B), of lanthanum oxide. The ceramic guide meets the requirements for guides for use in, e.g., small sized video cassettes, is non-magnetic, electrically conductive and has anti-static properties and, therefore, it does not generate static charge and has a low coefficient of friction during running of tape-like materials in contact therewith.

3 Claims, No Drawings

CERAMIC GUIDES FOR TAPE-LIKE MATERIALS AND PROCESS FOR THE PRODUCTION THEREOF

FIELD OF THE INVENTION

The present invention relates to ceramic guides for tape-like materials and a process for producing them. More particularly, it relates to ceramic guides for use in guiding running tape-like materials such as magnetic recording tapes, movie films, and microfilms, and a process for producing them.

BACKGROUND OF THE INVENTION

Guides for running tape-like materials such as magnetic recording tapes, movie films, and microfilms are used as parts of audio or video cassette tape recorders, projectors, processing devices and as path rolls in production devices for such tape-like materials.

Guides for magnetic recording tapes, for example, which are incorporated in video cassettes and so forth, have heretofore been made of metallic materials, e.g., stainless steel, or plastic materials, e.g., polyacetal.

Recently, magnetic recording materials for use in magnetic recording tapes have been extensively researched and, nowadays, various magnetic recording materials, e.g., ferromagnetic iron-cobalt oxides, ferromagnetic chromium dioxide, ferromagnetic alloy powders, iron, cobalt, and nickel, and used. Magnetic recording tapes prepared by providing magnetic recording materials as described above on a plastic film base by techniques such as solution coating or vapor deposition have been developed and are now on the market. Furthermore, in order to improve the running properties of magnetic recording tapes, it has been attempted to provide a back coat containing fine inorganic particles with a plastic material as a binder.

In addition, a reduction in the thickness of plastic film bases for long-time recording has been made, and low-speed running of tapes has been employed. Under such circumstances, the requirements of guides for use in small-sized video cassettes and the like have been markedly changing.

Typical properties required for tape guides are as follows:

(1) They do not have magnetic properties;

(2) They have electrical conductivity and anti-static properties;

(3) Their coefficient of contact friction to magnetic recording tapes are low, so that the running speed of a tape can be maintained at a certain level;

(4) They cause low damage to tapes running thereon and cause only limited drop-out; and (5) They have adequate mechanical properties to be incorporated into a cassette.

In general, ceramic materials are hard and of high abrasion resistance compared with metallic or plastic materials and, furthermore, ceramic materials have the advantage that they are free from corrosion on contact with air. Thus, attempts have been made to prepare guides for magnetic recording tapes using ceramic materials in place of conventional metallic materials. For example, Japanese Patent Publication No. 30766/76 discloses that an electrically conductive sintered molding of titanium monoxide has a coefficient of friction lower than metallic guides and it is not overly affected by temperature and humidity variations.

It has therefore been desired to develop superior ceramic materials meeting the above-described requirements for guides and, as a result of extensive research to prepare such ceramic materials, it has been found that, in addition to the type and the mechanical strength of the ceramic material used the finished surface of a guide made of a ceramic material has a significant influence on the above-described requirements.

SUMMARY OF THE INVENTION

It has now been found that sintered molded articles of (A) from 98 to 93 parts by weight of barium titanate, (B) from 2 to 7 parts by weight of an inorganic silicate binder, and (C) from 0.2 to 2 parts by weight, per 100 parts by weight of (A) and (B), of lanthanum oxide satisfy the above requirements for guides and are eminently suitable for use as guides.

The present invention, therefore, relates to a ceramic guide for tape-like materials exemplified by magnetic recording tapes which comprises a sintered molding of (A) 98 to 93 parts by weight of barium titanate, (B) 2 to 7 parts by weight of an inorganic silicate binder and (C) 0.2 to 2 parts by weight, per 100 parts by weight of (A) and (B), of lanthanum oxide.

DETAILED DESCRIPTION OF THE INVENTION

The present invention is based on the discovery that a barium titanate ($BaTiO_3$)-based sintered molding not containing lanthanum oxide ($La_2O_3$) (Sintered Molding (I)) and a barium titanate-based sintered molding containing lanthanum oxide (Sintered Molding (II)) are different from each other with respect to characteristics such as coefficient of friction to a magnetic recording tape. For example, although there is no significant difference in grain size between Sintered Molding (I) and Sintered Molding (II), an interference microscope photograph of the ground surface of Sintered Molding (II) shows that Sintered Molding (II) has a dense crystalline structure in which voids are considerably reduced.

When a running test using a small-sized video tape is conducted with Sintered Molding (I) the jitter is high and gradually increases, whereas with Sintered Molding (II) jitter is low and is stable. This demonstrates that when Sintered Molding (I) is subjected to final mechanical machining and finishing, it exhibits excellent guide characteristics and offers the advantages that the coefficient of friction is low and tape-chipping responsible for drop-out is reduced.

When the amount of lanthanum oxide added is less than 0.2 part by weight, the above-described effects are not obtained, whereas when it is more than 2 parts by weight, the mechanical properties of the resulting sintered molding are deteriorated; in particular, brittleness is increased, whereby chipping and cracking readily occur during fine working of the sintered molding which is not desirable in the fabrication of tape guides.

In this invention, in order to improve plasticity during molding and to increase mechanical strength after sintering, an inorganic silicate binder is used in such amount that the ratio of inorganic silicate binder to barium titanate is from 2/98 to 7/93. Silicate inorganic binders which can be used in the invention include binding clays (kaolin, Kibushi clay, Gairome clay), and other silica-alumina oxides. When the amount of inorganic silicate binder used is less than 2 parts by weight, the above-described effects are not obtained. On the other hand, when the inorganic silicate binder is added in amounts greater than 7 parts by weight, even if the amount of lanthanum oxide added is changed, or heating conditions are changed, sintered particles have increased size and the number of voids is increased, which is not suitable for tape guide use. Further, since mechanical strength is reduced, it is not preferred to assemble such guides into the device.

The barium titanate component constituting a major portion of the sintered molding of the present invention may be either barium titanate alone or a mixture of barium titanate and a minor proportion below 5 parts by weight of one or more of calcium, strontium or magnesium, i.e., titanates in which the barium is replaced by calcium, strontium or magnesium, or a mixture of barium titanate and a minor proportion below 5 parts by weight of barium stannate, barium zirconate or like barium compound, i.e., barium derivatives in which the titanium is replaced by tin, zirconium or the like.

In preparing the ceramic guide of the present invention, fine barium titanate powders having a particle size less than about 10 μm, an inorganic silicate binder and lanthanum oxide are weighed precisely in a proportion as specificied above and then water is added to the mixture in an amount sufficient to make a slurry. The resulting slurry is mixed in a ball mill and dried in an air bath. Then, while adding a constant amount of an organic binder and water, the bath is kneaded in a kneader and is molded by passing or extrusion molding and cutting. The molding is dried in an air bath and sintered in a reducing atmosphere, e.g., a nitrogen gas containing 3 volume % hydrogen gas or in an air-tight closed pot with carbon powder, etc. at a temperature from about 1000° to about 1500° for about 10 minutes to 24 hours. The sintering temperature is preferably between 1350° C. and 1450° C. The sintering time varies depending on the sintering temperature and the composition; in practice, it is determined taking into account the compactness and fineness of the crystalline structure and the mechanical strength desired.

Sintering in a reducing atmosphere provides antistatic properties to the sintered product. Reducing gases which can be used as the reducing atmosphere include those commonly used in the art, e.g., carbon monoxide gas, hydrogen gas, hydrogen-nitrogen mixed gas, etc.

A guide for a magnetic recording tape is generally in cylindrical form. These guides can be prepared by conventional ceramic molding techniques such as extrusion molding. They may also take other forms, e.g., where only the contact area is circular.

Although the above explanation has been made with reference to guides for magnetic recording tapes, the ceramic guides of the invention are not limited thereto, and they can be used not only as guides for running tape-like materials such as movie films and micro-films, but also as path rolls for conveying such tape-like materials.

The following examples are given to illustrate the invention in greater detail.

EXAMPLE 1

Barium titanate, kaolin, and lanthanum oxide were mixed in the proportions shown in Table 1, and 60 parts by weight of water were added to 100 parts of total powders. Each mixture was water-ground and mixed in a ball mill for 24 hours, removed from the ball mill, and dried at 120° C. To the thus-dried composition there was added 10% paraffin wax, the resulting mixture was uniformly ground and mixed and thereafter molded into a rod-like sample by cold pressing at room temperature and a pressure of 1,300 kg/cm.

The rod-like sample thus prepared was placed in a closed pot with carbon powder and sintered in a carbon monoxide gas atmosphere at 1,400° C. for 1 hour. The thus-sintered sample was mounted on a centerless grinder machine equipped with grindstones of Green Carborundum #100 and ground to form a rod having a diameter of 6.2 mm and a length of 16 mm. Finally, these samples were polished by the "Final Surface Finishing" as described in Table 1.

The surface roughness of the sample was measured along its lengthwise direction with a surface roughness-measuring instrument having a tip radius of 2 microns; the maximum surface roughness, Hmax, is shown in Table 1.

The coefficient of friction of the sample to a 16 μ thick polyester film was determined by the following equation:

$$\mu = \pi^{-1} \ln(T/50)$$

wherein $\mu$ is the coefficient of friction, T is the tension of the tape, $\pi$ is the ratio of the sample's circumference to its diameter. The tension, T, was measured by reading the value of T with a strain gauge when a load of 50 g was applied at a sample to film contact angle of 180°. This measurement was performed at 23° C. and a relative humidity of 55%.

With regard to indentation hardness, the Knoop hardness as determined for the ground surface under a load of 100 g and a pressing time of 15 seconds was measured.

For comparison, a metallic guide having the same size as above was prepared using SUS 316 stainless steel (Sample No. 7), and its characteristics are also shown in Table 1.

TABLE 1

| Sample No. | Composition (wt %) | | | Final Surface Finishing | Hmax (μ) | $H_{knoop}$ (kg/mm$^2$) | $\mu$ |
|---|---|---|---|---|---|---|---|
| | BaTiO$_3$ | Kaolin | La$_2$O$_3$ | | | | |
| 1 | 98 | 2 | 0.5 | GC# 1000$^{(1),(3)}$ | 0.9 | 515 | 0.19 |
| 2 | 98 | 2 | 0.5 | Buff polishing | 0.8 | 515 | 0.14 |
| 3 | 95 | 5 | 0 | Buff polishing | 0.8 | 573 | 0.19 |
| 4 | 95 | 5 | 0.5 | Buff polishing | 0.9 | 598 | 0.20 |
| 5 | 95 | 5 | 0.5 | Buff polishing | 0.9 | 598 | 0.13 |
| 6 | 93 | 7 | 1.0 | Barrel WA# 6000$^{(2),(4)}$ | 0.6 | 560 | 0.15 |

TABLE 1-continued

| Sample No. | Composition (wt %) | | | Final Surface Finishing | Hmax ($\mu$) | $H_{knoop}$ (kg/mm$^2$) | $\mu$ |
|---|---|---|---|---|---|---|---|
| | BaTiO$_3$ | Kaolin | La$_2$O$_3$ | | | | |
| 7 | SUS 316 metallic guide | | | Buff polishing | 0.3 | 316 | 0.22 |

Note:
[1]GC: Green Carborumdum: the symbol "#" indicates the index of the average particle size ($\bar{\phi}$) of abrasive by the Japanese Industrial Standard.

Average Particle Size ($\bar{\phi}$) ($\mu$m) $\approx \frac{15000}{\text{\# Index}}$

[2]WA: White Alundum
[3]Buff polishing is a method of wet surface polishing for ceramic or glass in which the surface of ceramic or glass is polished by felted cloth impregnated with a polishing material. In this example, zirconium oxide fine powder was used as a polishing material.
[4]Barrel polishing is a method of wet surface polishing and was performed using a slow-rotating open vessel containing samples to be polished, tip-carrier with polishing material and water.

As can be seen from Table 1, the barium titanate-based ceramic guide of the invention offers the advantage that, irrespective of its greater maximum surface roughness as compared to the conventional metallic guide, the coefficient of friction thereof was 0.2 or less. Further, it can be seen that the ceramic guide of the invention is at least about 1.6 times as hard as the conventional metallic guide, which is characteristic of a ceramic, and it has excellent abrasion resistance.

The volume specific resistance values of Sample Nos. 1 to 6 were from 4 to 73 ohm.cm, which are sufficiently low for practical use. It can thus be seen that they have excellent antistatic properties.

With regard to magnetic properties, which should be taken into consideration particularly in employing metallic guides, the magnetic properties of Sample No. 1, for example, was 0.013 EMU/g as determined at an outer magnetic field of 2,000 gauss. It was thus confirmed that the ceramic guides of the invention have no magnetic properties and do not exert any appreciable adverse influence on magnetic recording tapes.

EXAMPLE 2

Ceramic guides were prepared in the same manner as in Example 1 using barium titanate, kaolin, and lanthanum oxide in the proportions shown in Table 2. For these ceramic guides, dynamic characteristics were examined, that is, two guides of the same type were incorporated in a VHS type small size video cassette (fixed therein) and were subjected to practical testing.

The magnetic recording tape used comprised a 16 $\mu$ thick polyester base with cobalt-modified iron oxide particles coated thereon. A standard running test in which FF and REW modes were repeated at an average tapespeed of 1 m/sec was repeated 500 times. Thereafter, the number of drop-outs (per minute) in the reproduction mode was counted; the results are shown in Table 2.

With regard to the measurement of jitter, a Jitter Meter Model 875B (produced by Shibasock Corp.) was used to determine such at the initial stage and after 500 repeated FF/REW runnings. The values are shown in percent (%) in Table 2.

As can be seen from Table 2, the number of drop-outs after the 500 repeated runnings test was less than 20 per minute, which is equal to or less than the value of the metallic guide. With regard to jitter, as can be seen when Sample Nos. 3 and 4 are compared, the jitter of Sample No. 3 (Not containing La$_2$O$_3$) was generally high and, after 500 repeated runnings, it increased, which is undesirable for a guide for tape-like materials. On the other and, in the case of Sample No. 4 (containing La$_2$O$_3$), jitter was low, and almost no difference in jitter between before and after the repeated runnings was observed. This demonstrates that the ceramic guides of the invention are excellent.

The above examples establish that when a molded article comprising barium titanate, an inorganic silicate binder and lanthanum oxide is sintered in a reducing atmosphere and at least its contact surface is subjected to fine working in accordance with the invention, there can be obtained an excellent ceramic guide for magnetic recording tapes.

While the invention has been described in detail and with reference to specific embodiments thereof, it will be apparent to one skilled in the art that various changes and modifications can be made therein without departing from the spirit and scope thereof.

What is claimed is:

1. A ceramic guide for tape-like materials, comprising a sintered molding of (A) 98 to 93 parts by weight of barium titanate, (B) 2 to 7 parts by weight of an inorganic silicate binder, and (C) 0.2 to 2 parts by weight, per 100 parts by weight of (A) and (B), of lanthanum oxide.

2. The ceramic guide as claimed in claim 1, wherein at least the surface of the sintered molding which is used to contact with tape-like materials has been subjected to fine grinding and polishing.

3. A process for producing a ceramic guide for tape-like materials, which comprises molding a composition comprising (A) 98 to 93 parts by weight of barium titanate, (B) 2 to 7 parts by weight of an inorganic silicate binder, and (C) 0.2 to 2 parts by weight, per 100 parts by weight of (A) and (B) of lanthanum oxide, and sintering the resulting molding in a reducing atmosphere.

* * * * *

TABLE 2

| Sample No. | Composition (wt %) | | | Final Surface Finishing | Drop-out (per min.) | Jitter (%) | |
|---|---|---|---|---|---|---|---|
| | BaTiO$_3$ | Kaolin | La$_2$O$_3$ | | | Prior to repeated running | After repeated running |
| 1 | 98 | 2 | 0.5 | GC #3000 | 13 | 0.22 | 0.22 |
| 2 | 98 | 2 | 0.5 | Buff polishing | 17 | 0.25 | 0.26 |
| 3 | 95 | 5 | 0 | Buff polishing | 14 | 0.31 | 0.35 |
| 4 | 95 | 5 | 0.5 | Buff polishing | 10 | 0.26 | 0.27 |